US006986472B2

(12) United States Patent
Gordon

(10) Patent No.: US 6,986,472 B2
(45) Date of Patent: Jan. 17, 2006

(54) DISPENSING NOZZLE

(75) Inventor: Fergal Anthony Gordon, Kildare (IE)

(73) Assignee: Loctite (R&D) Ltd., Dublin (IE)

( * ) Notice: Subject to any disclaimer, the term of this patent is extended or adjusted under 35 U.S.C. 154(b) by 231 days.

(21) Appl. No.: 10/332,527

(22) PCT Filed: Jul. 16, 2001

(86) PCT No.: PCT/IE01/00092

§ 371 (c)(1),
(2), (4) Date: Jan. 10, 2003

(87) PCT Pub. No.: WO02/05970

PCT Pub. Date: Jan. 24, 2002

(65) Prior Publication Data

US 2003/0222160 A1 Dec. 4, 2003

(51) Int. Cl.
*B25J 11/00* (2006.01)

(52) U.S. Cl. .................. 239/225.1; 239/227; 239/602; 222/529; 901/43

(58) Field of Classification Search ........ 222/325–327, 222/386, 387, 390, 391, 491–494, 511, 513, 222/566–575, 529, 602; 264/261; 118/13, 118/14, 24, 25; 425/87, 458, 461; 901/43; 239/227, 620

See application file for complete search history.

(56) References Cited

U.S. PATENT DOCUMENTS

| | | | | |
|---|---|---|---|---|
| 591,067 | A * | 10/1897 | Wallace | 239/602 |
| 3,254,869 | A * | 6/1966 | Easey | 251/4 |
| 3,884,394 | A | 5/1975 | Gordon et al. | 222/327 |
| 4,109,836 | A * | 8/1978 | Falarde | 222/494 |
| 4,643,863 | A * | 2/1987 | Martini | 264/219 |
| 4,877,160 | A * | 10/1989 | Derving | 222/494 |
| 4,981,629 | A | 1/1991 | Cook | 264/33 |
| 5,105,997 | A * | 4/1992 | Wakabayashi et al. | 222/494 |
| 5,215,034 | A | 6/1993 | Ronsheim | 118/323 |
| 5,992,763 | A | 11/1999 | Smith et al. | 239/428.5 |
| 6,626,996 | B1 * | 9/2003 | Amigh et al. | 118/681 |

FOREIGN PATENT DOCUMENTS

| | | |
|---|---|---|
| DE | 37 23 100 A1 | 1/1989 |
| DE | 94 11 980.5 | 10/1994 |

* cited by examiner

*Primary Examiner*—Philippe Derakshani
(74) *Attorney, Agent, or Firm*—Steven C. Bauman

(57) ABSTRACT

A dispensing nozzle for dispensing anaerobic adhesives/sealants in an automated dispensing system, is provided. More specifically, the nozzle having a hollow body with an entry port and an exit port, the body having a wall with an internal wall surface which defines an elongate conduit arranged about a longitudinal axis of the nozzle, and linking the entry port to the exit port, where at the exit port the internal wall surface alternates in distance from the axis of the nozzle between axis proximate positions and axis distal positions, thereby forming a dispensing opening in the exit port of non-circular cross sectional area. The wall is flexible radially outwardly in the regions of the axis proximate positions.

22 Claims, 10 Drawing Sheets

DISPENSING NOZZLE

FIELD OF THE INVENTION

The invention relates to dispensing nozzles and in particular to a dispensing nozzle adapted to be incorporated into an automated dispensing system for the dispensing of viscous fluids such as adhesives onto a substrate.

BACKGROUND TO THE INVENTION

Dispensing nozzles are well known for dispensing fluids supplied directly or indirectly from storage containers to a substrate. They are used widely in industry for many applications. One particular application is the use of nozzles to dispense adhesives as sealants in the provision of gaskets in the automotive industry. In robotic applications the nozzle is incorporated onto a programmed automated arm which then moves the nozzle about a substrate in a predetermined path. (See e.g. U.S. Pat. No. 5,215,034 Ronsheim.) FIG. 1 of the drawings accompanying the present patent application shows an example of an anaerobic gasketing application utilising one such known dispensing nozzle 100 having a circular aperture dispensing adhesive 110 onto a substrate 120 from a height of about 5 mm. When dispensing in such an arrangement there is a tendency for the adhesive to curl up and stick to the outside of the end portion 130 of the nozzle 100, thereby interrupting the flow of adhesive from the end portion of the nozzle to the substrate and resulting in breaks 140 in the applied adhesive on the substrate. It is possible to lessen this effect by reducing the height of the nozzle end portion above the substrate, which for this particular application is found to have an optimum height of about 2 mm above the substrate.

In the provision of liquid gasketing materials it is common to use anaerobic adhesives. These adhesives are so called because they do not cure in the presence of air. As such the adhesives are typically supplied in mechanically sealed permeable containers with air contained therein. The nature of the constituents of the adhesive, and the fact that it is the presence of air that inhibits curing, means that it is essential for the adhesive to contact air during storage and prior to application. Otherwise, the shelf life of the adhesive becomes compromised.

Despite treatment to eliminate larger air bubbles, it is not uncommon for these products to have bubbles contained therein, along with dissolved air. The presence of the air bubbles in the adhesive tends to cause breaks in the flow from the container and in the adhesive bead created. After the passage of a bubble out of the dispensing tip, normal adhesive is dispensed again, which re-establishes the continuity of the adhesive bead. The surface area of the exit port of the dispensing nozzle and the height of the nozzle from the substrate affect the quality of the bead being laid down. If a break occurs and the nozzle is at a large distance away from the substrate then the length of the break as seen on the substrate will be large.

It is believed that air bubbles tend to vent at the wall surface of the nozzle and if such bubbles are successfully vented at the exit port no break in the bead will occur. However, a circular exit port has only a limited wall surface, corresponding to the circumference of the circle, and it is believed that some bubbles tend to become trapped at the centre of the product flowing out of the exit port and do not reach the wall surface for venting.

The minimum bead size that should be applied to a substrate is in many cases a matter of judgement. If an excessively small bead is specified small bubbles in the adhesive may cause breaks in the applied bead. A more substantial bead would envelop a small bubble so that a good quality application of the product to the substrate without a break could be achieved despite the presence of the bubble. There is, therefore, a balance between applying an unduly large amount of product, which would be expensive, and applying a bead so small that it can not be reliably dispensed without blockages. In general users of automated dispensing systems want smaller beads and therefore smaller nozzles than have been used heretofore.

Many gasketing products are resin based which gives them particular properties when being dispensed. They generally have a high viscosity and a yield point, and at low shear stresses behave like solids. When these products are being dispensed and are between a nozzle and the substrate they can behave like a string, rather than as a flow of liquid. If the velocity of the product relative to the nozzle is less than the robot speed, the product will be under tension. A bubble in the adhesive will tend to cause the bead to break, even when the original bubble itself is small enough to be incorporated into the bead. It is more desirable to push the product from the nozzle onto the substrate, rather than pull it from the nozzle onto the substrate. The effect of any bubbles is minimised the faster the product flows from the nozzle, which suggests that the ratio of product velocity to the robot velocity is important; current understanding recommending a minimum ratio of 1 and preferably of at least 2. The velocity ratio may also be expressed as an area ratio as follows:

$$R_v = \frac{V_P}{V_R} = \frac{A_B}{A_N}$$

where:

$R_V$=The velocity ratio $V_P$=The velocity of the product relative to the nozzle $V_R$=The velocity of the robot $A_N$=The cross-sectional area of the nozzle $A_B$=The cross-sectional area of the bead.

The cross sectional area of the bead can be calculated from the dispensing flow rate and the robot speed as follows:

$$A_B = \frac{w}{V_R t \rho}$$

where:

w=the weight of a quantity of dispensed product t=the dispense time

ρ=the product density.

In the accompanying drawings, FIG. 1*a* is a graph of nozzle diameter (mm) against bead cross section ($mm^2$) for two velocity ratios:

$$R_v = \frac{A_B}{A_N} = 1$$

and $$R_v = \frac{A_B}{A_N} = 2$$

Dotted lines across the graph correspond to circular nozzles having diameters of 0.84 mm ($A_N$=0.55 mm$^2$), 1.19 mm ($A_N$=1.11 mm$^2$), 1.36 mm ($A_N$=1.45 mm $^2$) and 1.54 mm ($A_N$=1.86 mm$^2$). The best area on the chart is below the lower curve ($R_v$>2). A compromise is the area between the curves (1<$R_v$<2). A nozzle should be chosen from the chart so that it intersects the lower curved line at a bead cross-section value that is less than the desired bead size. It is evident using this basis that the diameter of the nozzle outlet has a significant effect on the quality of the dispensed bead of adhesive, with smaller nozzle diameters achieving better quality of dispensed product of small cross-sectional areas.

Although it is preferable to use smaller diameter nozzles so as to achieve improved dispensed bead quality, there are limitations in achievable dispensed bead cross-section relative to nozzle outlet diameter. There are problems in using smaller nozzle diameters in that the nozzle diameters are also governed by the particle size of the filler or partly cured polymer in the product. Desirably, the products are filtered to exclude particles having a size greater than 300 microns, and it is recommended that the nozzle diameter should be at least three times the filter size. With conventional circular cross-sectional area nozzles it has been demonstrated that in order to achieve good quality bead cross-sectional areas of less than approximately 1.2 mm$^2$ it is necessary to reduce the nozzle outlet diameter to, or below, approximately 0.84 mm, which is less than the recommended three times filter size. Using such small nozzle diameters introduces problems into the dispensing system as the nozzles are prone to blocking or clogging if any large particles are present in the material being dispensed.

There therefore exists a need to provide a dispensing nozzle that simulates a small circular cross sectional area, thereby providing good quality dispensed beading, yet is not prone to the effects of blockages.

Various forms of nozzle are known for use in fields other than automated dispensing systems (e.g. manual dispensing devices). U.S. Pat. No. 3,884,396 Gordon et al. refers to nozzles known in the field of caulking guns and also the field of cake or candy decorating devices, including a nozzle which has a star-shaped orifice. As pointed out in the '396 patent, such nozzles are made of rigid material where the shape of the orifice remains unchanged over a wide range of extruding pressure, since the purpose of the nozzle is to form an extrusion having a definite cross-sectional shape, i.e. corresponding to that of the orifice. The '396 patent itself is directed to a dispenser for salad dressing or mayonnaise. The manually-operated apparatus has an extrusion nozzle comprising a core made of flexible and resilient material, with a circular orifice portion lying in a plane transverse to the axis of the core and truncating the core near its apex, and a plurality of slots formed in the core and extending in a converging relation from points near the base of the core into the circular orifice portion, the material of the core lying between the slots comprising a plurality of flexible resilient fingers. These pliable petal-like blades open as rapidly as required under varying degrees of pressure to define a temporary orifice of larger area through which contents can only emerge at low velocity. The circular orifice is defined by the tips of the fingers, which are separated by the slots, i.e. the nozzle is not continuous in the plane of the orifice. The fingers flex under normal dispensing conditions to give a larger orifice and this will allow for an increase in volumetric flow without a significant increase in velocity. This is contrary to what is required for a good quality bead and the nozzle of the '396 patent would not be suitable for automated dispensing.

German Gebrauchsmuster G 94 11 980.5 Ritter describes a closure for the month-piece of a cartridge, particularly for printing pigments. The closure is in the form of a membrane extending transversely across the mouth, with radical slits which define tongues in the membrane. As shown in FIG. 2B, the membrane has a very small space at the tips of the fingers and effectively has no dispensing opening in the rest condition. When pressure is applied to the cartridge, in normal dispensing conditions, the tongues flex axially outwards (see FIG. 3A). This also would be unsuitable for forming a good quality bead in automated dispensing.

U.S. Pat. No. 4,981,629 Cook describes a tool for applying caulking manually. The dispensing opening has a generally trapezoidal appearance. It is clear from the description of the use of the tool that it is made of rigid material. The '629 patent does not provide any teaching relevant to automated dispenser systems.

German Offenlegungschrift DE 37 23 100 A1 shows apparatus for dispensing a filler around a fixing. The spray tube has a funnel-shaped broadened rim with notches or indentations. Despite the state-of-the-technology it would be desirable to provide a dispensing nozzle for dispensing fluids in bead form in an automated dispensing system.

SUMMARY OF THE INVENTION

Accordingly in one aspect of the present invention a dispensing nozzle for dispensing fluids in bead form in an automated dispensing system is provided, the nozzle having a hollow body with an entry port and an exit port, the body having a wall with an internal wall surface which defines an elongate conduit arranged about a longitudinal axis of the nozzle, and linking the entry port to the exit port, wherein at the exit port the internal wall surface alternates in distance from the axis between axis proximate positions and axis distal positions, thereby forming a dispensing opening in the exit port of non-circular cross-sectional area.

The non-circular shape of the dispensing opening has a greater wall surface perimeter available for venting air bubbles than a circular exit port of similar cross-sectional area. The non-circular shape also facilitates flow of a dispensed fluid despite the presence of particles which might cause blockage of a circular exit port.

Any shape that varies substantially from a circle may be useful, for example a bellows shape.

According to one aspect of the invention, the wall of the nozzle body in the regions of the axis proximate positions is flexible radially outwardly. This permits one or more particle which may be blocking passage through the elongate conduit to be freed so that they may pass through the exit port.

In accordance with another feature of the invention, the wall of the nozzle body is of a generally uniform wall thickness around the exit port, so that the external wall surface extends generally parallel to the internal wall surface and the wall alternates in distance from the axis between axis proximate positions and axis distal positions. This facilitates flexing of the wall radially outwardly at the axis proximate positions.

In accordance with a further feature of the invention, the exit port includes a dispensing region of substantially non-circular cross-section formed by the body wall, with ribs on the outer surface of the body resulting from the formation of the axis distal positions of the wall, and valleys between the ribs corresponding to the axis proximate positions. The dispensing region is in the tip portion (or end portion) of the nozzle and the conduit extending through the tip portion is of substantially non-circular cross-section. The ribs and valleys extend axially inwardly from the dispensing opening. Suitable the ribbed portion of the body wall tapers towards the dispensing opening. Normally each rib comprises a crest and two shoulders. Desirably the distance from the longitudinal axis of both the crests and the valleys increases from a minimum at the dispensing opening to a maximum at the inward end of the ribbed portion of the wall. Desirably also the radial distance between each valley and an adjacent crest reduces from a maximum distance at the dispensing opening to a minimum at the inward end of the ribbed portion. The various elements of this structure contribute individually or in combination to forming a conduit of non-circular cross-section extending inside the ribbed portion of the wall and narrowing towards the dispensing opening but capable of expanding radially outwardly in the dispensing region, in order to free a blocking particle. Due to the configuration of the ribs and valleys, the wall is capable of flexing radially outwardly in the valley regions.

The material of the wall should be chosen such as to allow the valley regions to flex when a particle is blocking the conduit in the dispensing region but to remain substantially unflexed during normal dispensing. The thickness of the body wall will be selected by the skilled person, depending upon various factors such as the fluid to be dispensed, the pressure to be applied to the fluid entering the nozzle, the dimensions of the dispensing opening and the bead to be formed, the material used to form the wall and the technology available for manufacturing the nozzle. Suitably the wall thickness (measured radially) may be in range 0.1 to 0.3 mm, particularly for a nozzle used in dispensing anaerobic adhesives to form a bead of gasketing material.

In the plane of the dispensing opening, the wall defining the dispensing opening should be continuous i.e. there should be no slits in the wall parallel to the axis. This reduces the risk of expansion of the dispensing opening under normal dispensing conditions. There is no axial component in the radial flexing of the valley regions of the wall.

Suitably, the alternating in distance of the wall from the axis forms a dispensing opening having a plurality of lobes extending radially from the axis, the lobes being spaced circumferentially about the axis.

Desirably, the lobes are equally spaced about the axis. Suitably there are at least three lobes, particularly three or four lobes, and desirably not more than 8 lobes.

However a dispensing opening having a large number of small lobes may be used. Each lobe may extend in a radial direction, or may follow an arc from the axis, in the manner of a turbine blade. Each lobe may extend for an equal distance from the axis, or the lobes may have two or more different lengths.

The equal spacing of at least three lobes about the axis enables the nozzle, in use, to effect the same quality of dispensing of product onto the substrate, regardless of the direction of application, thereby forming an omni-directional dispensing system.

The plurality of axis distal positions of the internal wall surface define apexes of respective lobes.

The axis proximate positions of the internal wall surface define therebetween a plurality of mouths of lobes, each mouth being defined by the region between two adjacent axis proximate positions.

A lobe is defined by the wall surface region running between two adjacent axis proximate positions via an axis distal position which is disposed between the two adjacent axis proximate positions.

At each of the lobes formed by a deformation of the inner conduit, a rib will suitably be formed in the body wall, and valley regions will be formed between the lobes. Desirably, the valley regions of the wall are flexible radially outwardly. Preferably the valley regions of the wall are formed with a smooth curve. This facilitates radially outward flexing of the valley regions of the wall.

Desirably, the axis proximate positions of the internal wall surface are disposed on a notional circle which defines a main dispensing region of the dispensing opening. The diameter of this notional circle may be significantly smaller than the diameter of a circular exit port on nozzles available heretofore e.g. a notional circle diameter in the range of 0.2–0.6 mm as compared to a diameter of 0.84 mm for a commercially available circular nozzle.

In one particular type of embodiment, the internal wall surface at the axis proximate positions may suitably be at a distance of 0.1 mm to 0.5 mm, particularly 0.125 mm to 0.175 mm from the axis, so that a notional circle through the said positions has a diameter of 0.2 mm to 1 mm, particularly 0.25 mm to 0.35 mm. For an embodiment having three lobes, the internal wall surface at the axis distal positions may suitably be at a distance of 0.5 mm to 1.5 mm, particularly 0.8 mm to 1.2 mm, more particularly 0.95 to 1.05 mm from the axis. Each lobe may suitably have a length from the central dispensing region to the lobe tip of 0.4 mm to 1 mm, particularly 0.8 mm to 0.9 mm.

The fluid is preferably a viscous fluid, for example having a DIN viscosity in the range from about 5 to about 120,000 Pa.s as measured at 25° C. More preferably it is a viscous fluid containing air bubbles, and more preferably an adhesive/sealant, particularly an anaerobic adhesive, which is likely to have air entrained therein. Suitably the fluid is a reactive material such as a gasketing material, and more suitably an anaerobic material.

Desirably, the dispensing nozzle is adapted to be incorporated into a robotic dispensing system for dispensing fluid from a storage container to a substrate, the entry port optionally forming an integral part of the storage container or alternatively being connectable to the system and adapted to be in fluid communication with the storage container.

Suitably the dispensing system is adapted to dispense fluids in the automotive industry, the dispensed fluids forming a gasket on an automotive component.

Desirably, the nozzle is formed from a plastics material, the material enabling a degree of compliance or flexibility of the nozzle end portion in the regions of the axis proximate positions.

Suitably a minor part of the length of the nozzle forms a nozzle end portion adjacent to the exit port. Desirably the nozzle end portion is generally conical, so that a substantial portion of the body defines a broad conduit and the conduit only narrows down in the nozzle end portion to the dimensions of the exit port. This reduces the risk of blockage as compared to a nozzle having a conduit with the same cross-sectional area as the exit port for the full length or a major part of the length of the nozzle.

According to one aspect the present invention provides a dispensing nozzle adapted to be incorporated into an automated dispensing system for dispensing viscous fluids from a storage container onto a substrate, the nozzle having an inner conduit leading to an exit port and adaptable to be in fluid communication with the storage container, the exit port having a central dispensing region and at least two dispensing lobes extending from the central dispensing region.

The viscous fluids are preferably adhesives or sealants and more preferably anaerobic adhesives or sealants.

Desirably, the at least two dispensing lobes are preferably formed by a deformation of the inner conduit, the lobes suitably being dimensioned so as to have a large cross section area adjacent the central dispensing region and tapering from the main dispensing region to a small cross section area. However, in an alternative embodiment, the lobes (or some of them) could expand radially outwards from the main dispensing region.

Desirably, the at least two lobes are equally spaced about the main dispensing region. Suitably, there are at least three lobes.

The present invention also provides an automated dispensing system incorporating a nozzle as defined above.

In a further aspect, the invention relates to use of a nozzle as defined above in the automated dispensing of a fluid onto a substrate. Suitably the fluid is a gasketing material, more particularly an anaerobic adhesive or sealant.

In another aspect, the invention provides a method of forming a bead of adhesive on a substrate which comprises applying the adhesive by means of a nozzle as defined above.

Several embodiments of the invention are described below by way of non-limiting example with reference to the accompanying drawings.

DETAILED DESCRIPTION OF THE DRAWINGS

Figure 1:
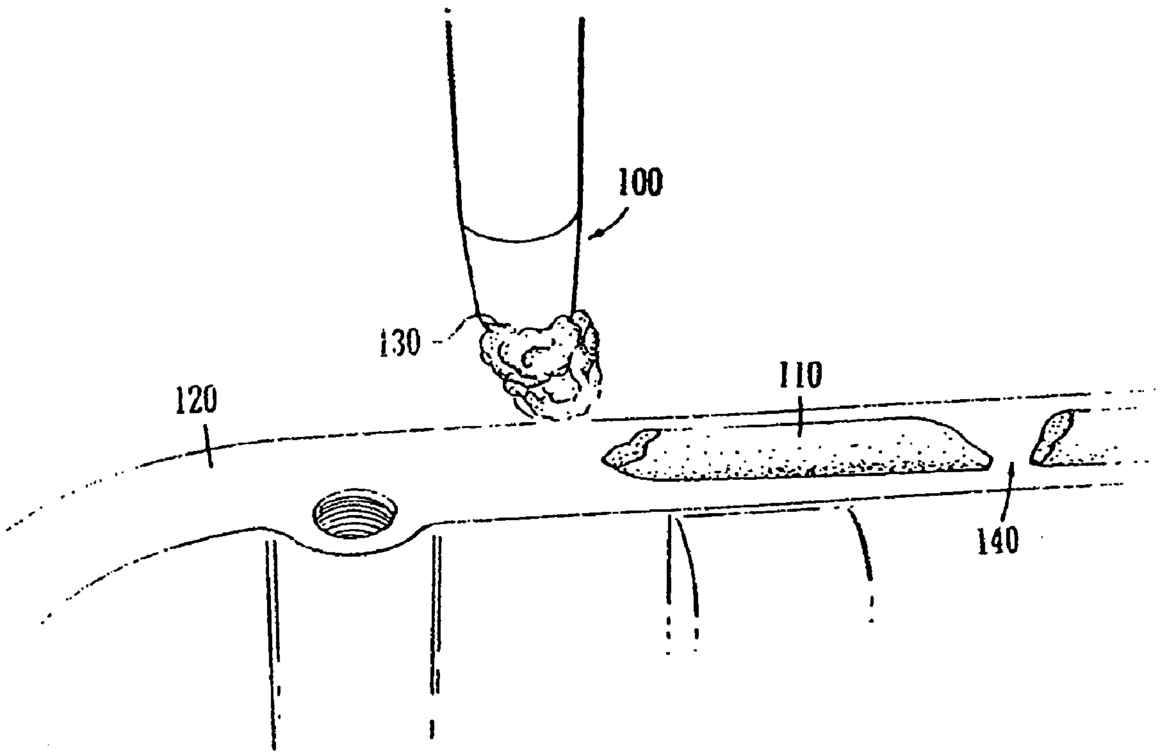
FIG. 1 PRIOR ART
FIG. 1 is a pictorial view of a dispensing nozzle according to the prior art, dispensing product onto a substrate.
Figure 1A:
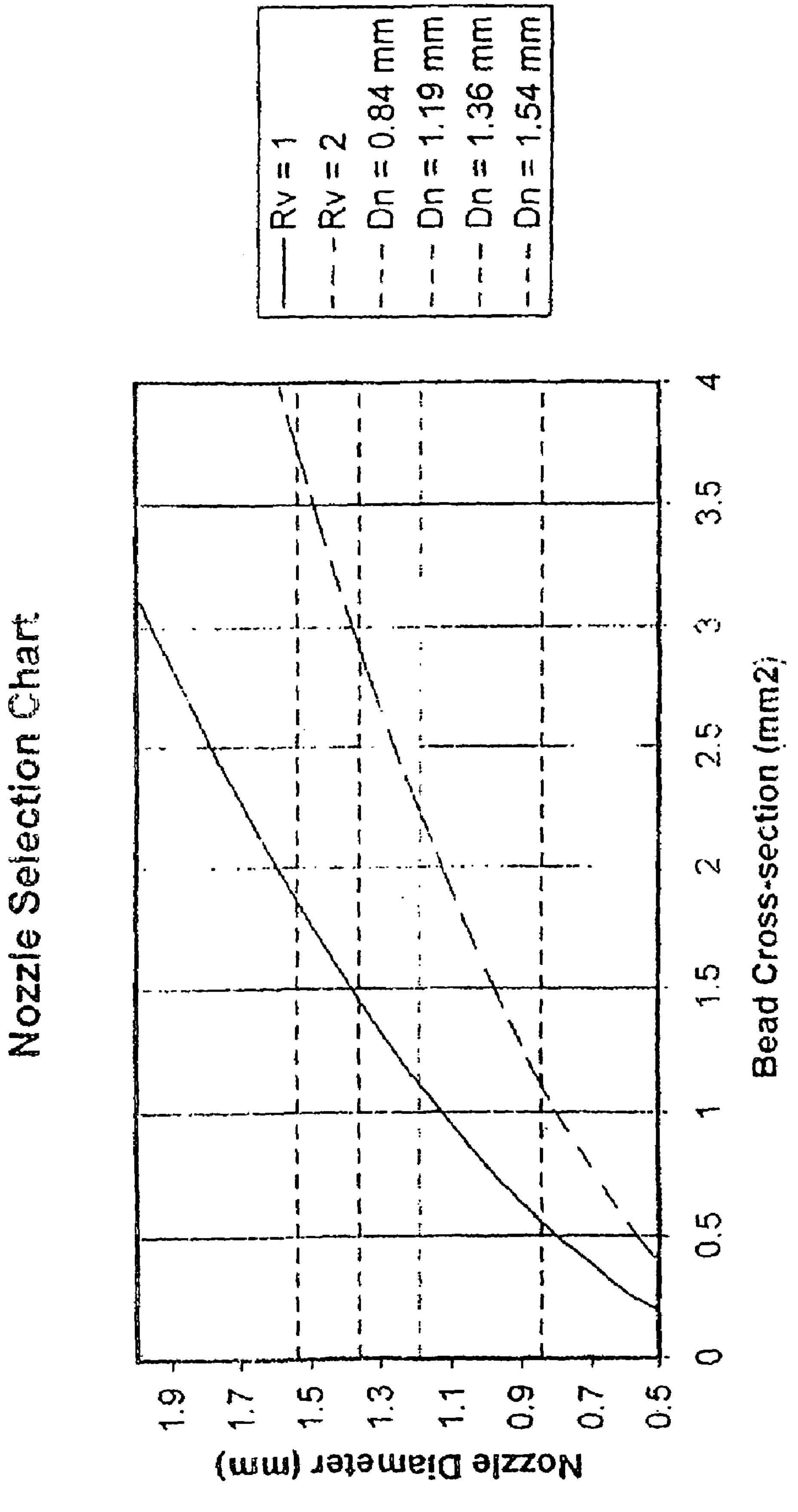
FIG. 1*a* is a graph showing the relationship between nozzle diameters of nozzles of known type having a circular dispensing opening, and applied bead cross-sectional area.
Figure 2:
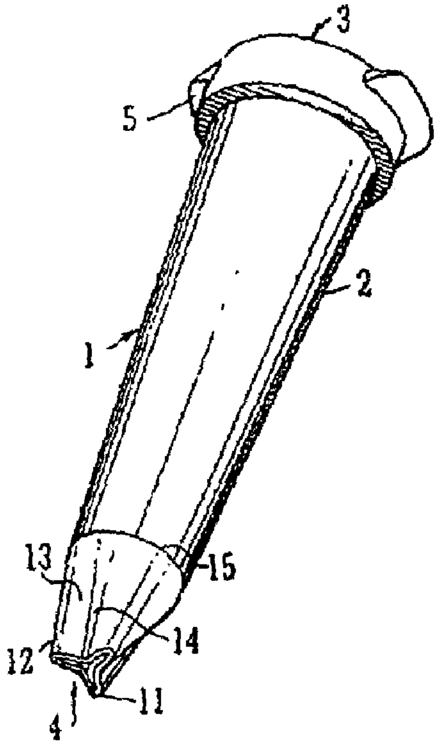
FIG. 2 is a perspective view of a dispensing nozzle according to a first embodiment of the present invention.

FIGS. 1 and 1*a* have been discussed, in the section on Background to the Invention above, with reference to the dispensing of adhesive product onto a substrate, and also with reference to the relationship between known nozzle diameters and applied bead cross-sectional areas respectively.

FIGS. 2 to 9 show a dispensing nozzle 1 according to a first embodiment of the present invention. As shown in the perspective view of FIG. 2, the nozzle 1 has a body 2 with an entry port 3 and an exit port 4. Two connection means 5 are provided at the entry port 3, the connection means adapted to connect and maintain the nozzle 1 in contact with a dispensing system (see below). The connection means are typically of the variety known in the art as a Luer lock, and are adapted to facilitate the easy connection of the nozzle to a dispensing system. As shown in the side view of the nozzle of FIG. 3, the nozzle 1 has a longitudinal axis 6, extending from the entry port 3 to the exit port 4.

Figure 4:
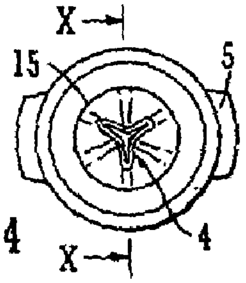
FIG. 4 is a view from below of the nozzle of FIG. 2.
Figure 5:
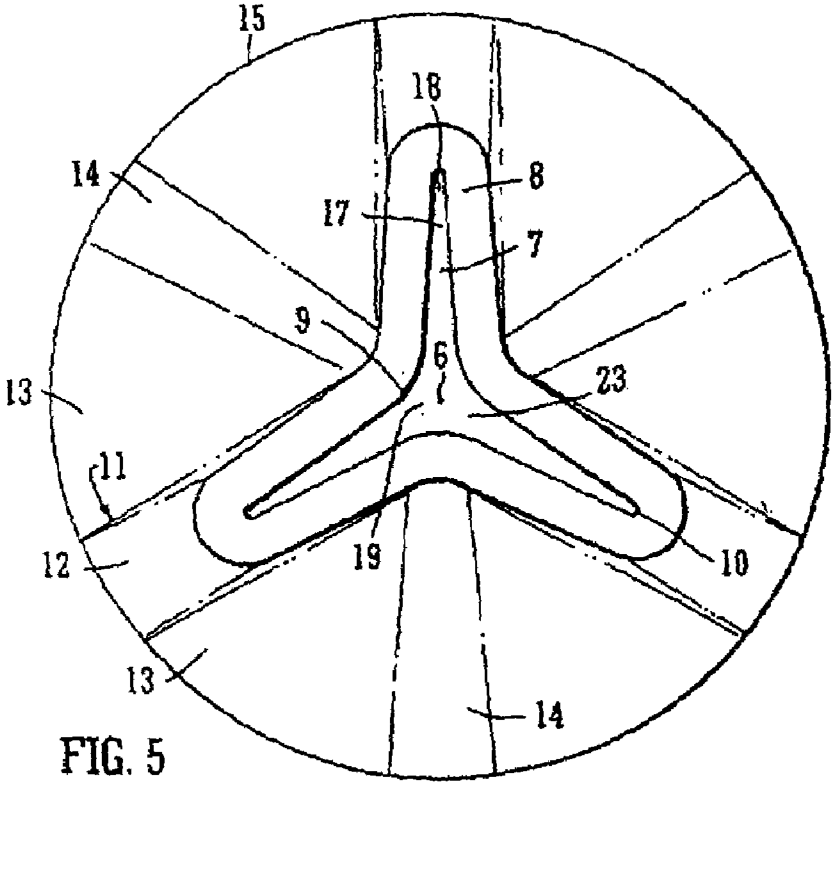
FIG. 5 is an enlarged view of a portion of FIG. 4.

FIG. 4 is a view from below the nozzle 1 and FIG. 5 is an enlarged view of the tip portion of the nozzle. The exit port 4 comprises a dispensing region 7 of substantially non-circular cross sectional area formed from the body wall 8 at the exit port 4, alternating in distance from the axis 6 of the nozzle 1 between axis proximate positions 9 and axis distal positions 10. The defining of the non-circular cross section dispensing region 7 resulting from the formation of the axis proximate positions 9 and axis distal positions 10 produces a formation of ribs 11 on the outer surface of the body 2 of the nozzle 1. Each rib 11 comprises a crest 12 and two shoulders 13. The region between crests 12 of adjacent ribs defines a valley 14. The distance from the longitudinal axis of both the crests and the valleys increases from the exit port 4 to a transition line 15. Similarly, the shoulder height or distance between the valley 14 and the adjacent crest 12 reduces from a maximum distance at the exit port to the transition line 15 such that the rib is more prominent at the exit port 4 than at the transition line 15.

As can be seen in the drawings, the wall 8 is of generally uniform wall thickness around the exit port 4. The external wall surface extends generally parallel to the internal wall surface. The wall 8 is continuous in the plane of the dispensing opening, i.e. it is not interrupted by any slots or slits. The wall 8 is smoothly curved in the valley regions.

Figure 3:
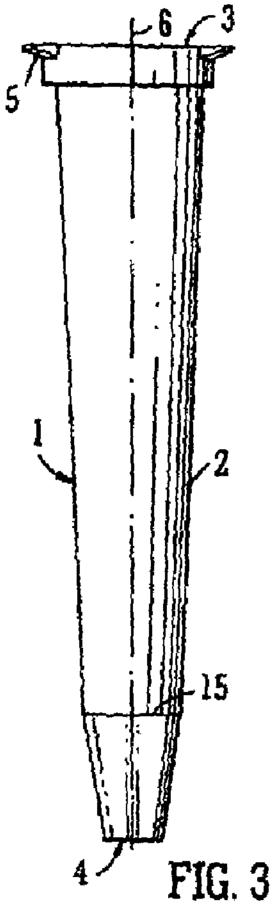
FIG. 3 is a side view of the nozzle of FIG. 2.
Figure 6:
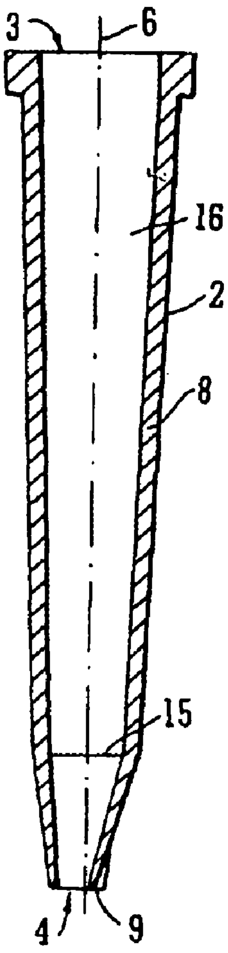
FIG. 6 is a section along the line X—X of FIG. 4.

FIG. 6 is a section through the nozzle shown in FIG. 3. The wall 8 of the body 2 defines an elongate conduit 16 arranged about the longitudinal axis 6 of the nozzle, thereby linking the entry port 3 to the exit port 4 and providing a passage for fluid to travel between the entry port 3 and the exit port 4. In this embodiment (for manufacturing reasons) the body 2 of the nozzle 1 tapers slightly from the entry port 3 to the transition line 15. In the region of the body above the transition line 15 the outer surface of the body 2 is conical. In one embodiment the wall thickness is about 0.5 mm in the region above the transition line. Below the transition line 15, the body 2 tapers sharply to the exit port 4 and its wall is ribbed as already described. This is a nozzle end portion. In one embodiment the wall thickness reduces in the end portion from 0.5 mm at the transition line to 0.2 mm at the dispensing opening.

In the first embodiment as particularly shown in FIG. 5, the dispensing region 7 is formed from three lobes 17 extending radially outwardly from and arranged circumferentially about a central dispensing region 23 which surrounds the longitudinal axis 6. The plurality of axis distal positions 10 define apexes 18 of respective lobes, with the axis proximate positions 9 defining a plurality of mouths 19 of lobes, each mouth 19 being defined by the region between two adjacent axis proximate positions 9. The lobes are thereby defined by the wall region running between two adjacent axis proximate positions 9 via an axis distal position 10 disposed between the two adjacent axis proximate positions 9. In this embodiment, primarily for ease in moulding, the distance between the opposing faces of the lobe is at a maximum at the mouth 19 of the lobe and reduces towards the apex 18. However each lobe may have parallel walls, if desired.

In this embodiment, a nozzle having a central dispensing region defined by a notional circle having a diameter of about 0.3 mm is designed to have a dispensing opening having an area of about 0.363 $mm^2$, which would be equivalent to a circular opening having a diameter of 0.68 mm, and a perimeter of 5.853 mm, which would be equivalent to a circle having a diameter of 1.843 mm.

Figure 10:
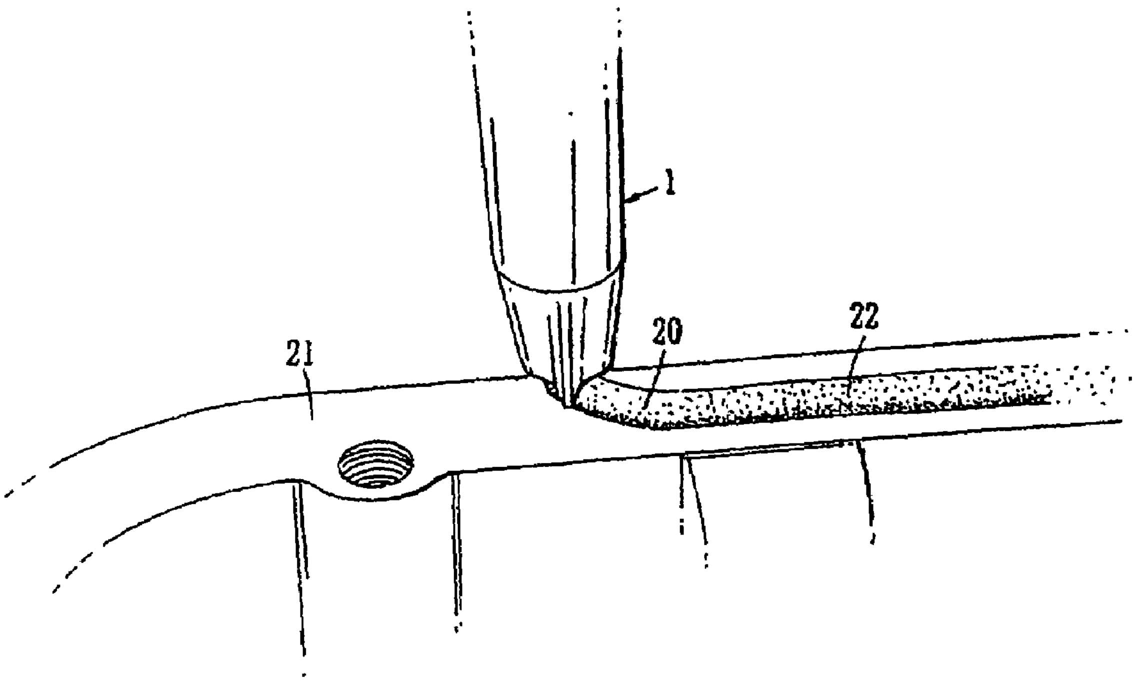
FIG. 10 is a pictorial view of a nozzle of the invention applying adhesive to a substrate.

The equi-spaced circumferential arrangement of the three lobes 17 about the axis 6 preferably forms a nozzle that can be used equally well in any direction of application, thereby forming an omni-directional dispensing nozzle. As shown in FIG. 10 the nozzle 1 may be used to apply an adhesive product 20, onto a substrate 21, which is typically an engine component for use in the automotive industry. The applied product 20 forms a bead of adhesive 22, which when two mating components are brought together will form a gasket between the components.

Although the invention is not limited by any theory it is thought that most of the applied product 20 is dispensed through the central dispensing region 23, which is a substantially circular cross-section region arranged about the longitudinal axis 6 and defined by a notional circle touching the wall 8 at its axis proximate positions 9. It is thought that viscous drag effects caused by the proximity of the inner surface of the wall 8 in the lobes slows the flow of product through the lobes.

The notional circle at the central dispensing region may have a diameter of about 0.3 mm. An air bubble in the adhesive product being dispensed through the nozzle will be very close to the wall 8 in the central dispensing region 23 or in one of the lobes 17. The exit port has a much longer perimeter than a circular exit port of comparable cross-sectional area. For both of these reasons (reduced mean distance to the wall surface and longer perimeter), the likelihood of an air bubble reaching the wall surface and being vented at the exit port is greatly enhanced.

Figure 8:
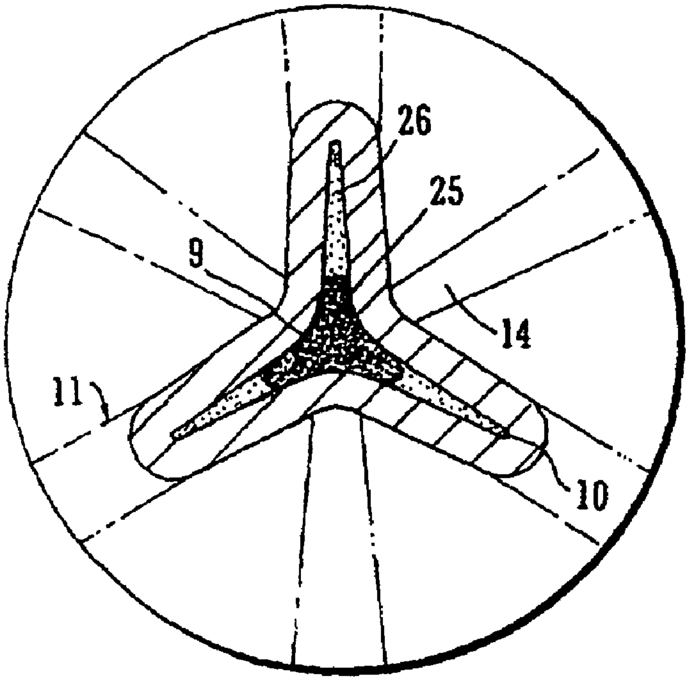
FIG. 8 is a section on the line Y—Y in FIG. 7, showing the nozzle in use for dispensing.
Figure 9:
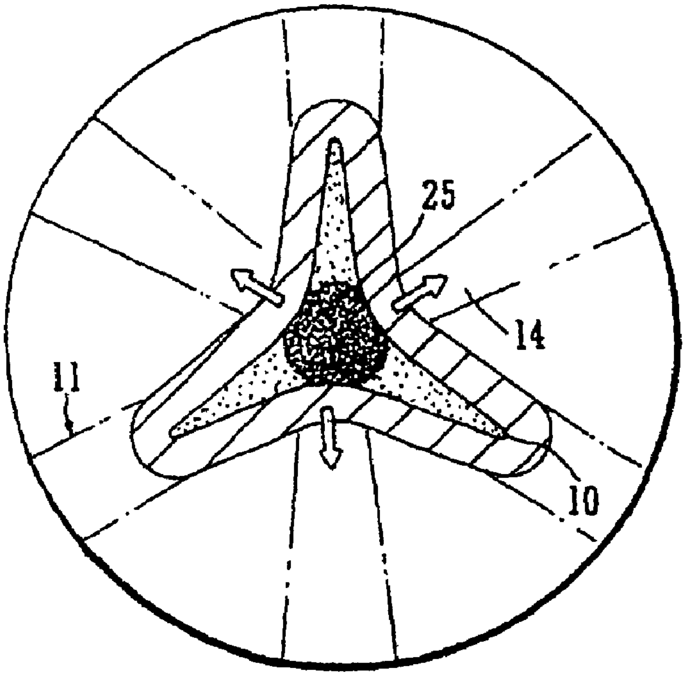
FIG. 9 is a similar section on the line Y—Y in FIG. 7 but showing the nozzle tip in an expanded condition.

A circular exit port having a diameter as small as that of the central dispensing region 23 would be at risk of blockage by particles in the adhesive product. The exit port with lobes according to the invention overcomes this problem. FIGS. 8 and 9 are sections through a nozzle end portion showing two modes of passage of a blockage through the nozzle. In general, particles (whether of filler or partially-cured polymer) will be semi-solid but flexible. As shown in FIG. 8, the particle 25 may form a blockage in the central dispensing region 23 and possibly in the mouths of the lobes 17, (see FIG. 5), but the adhesive product will continue to flow around the blockage in the radially-outer parts of each of the lobes. This continued flow may in itself be sufficient to cause the blockage to be released. If not, the particle will be likely to press against the wall 8 in the exit port and pressure will build up in the fluid in the conduit, causing the valley regions 14 of the wall 8 (see FIG. 5) to flex radially outwardly as indicated by the arrows in FIG. 9. After sufficient expansion of the central dispensing region, the blocking particle will be freed to pass out through the exit port, after which the valley regions will flex back radially inwardly to the normal position of FIG. 8.

Figure 7:
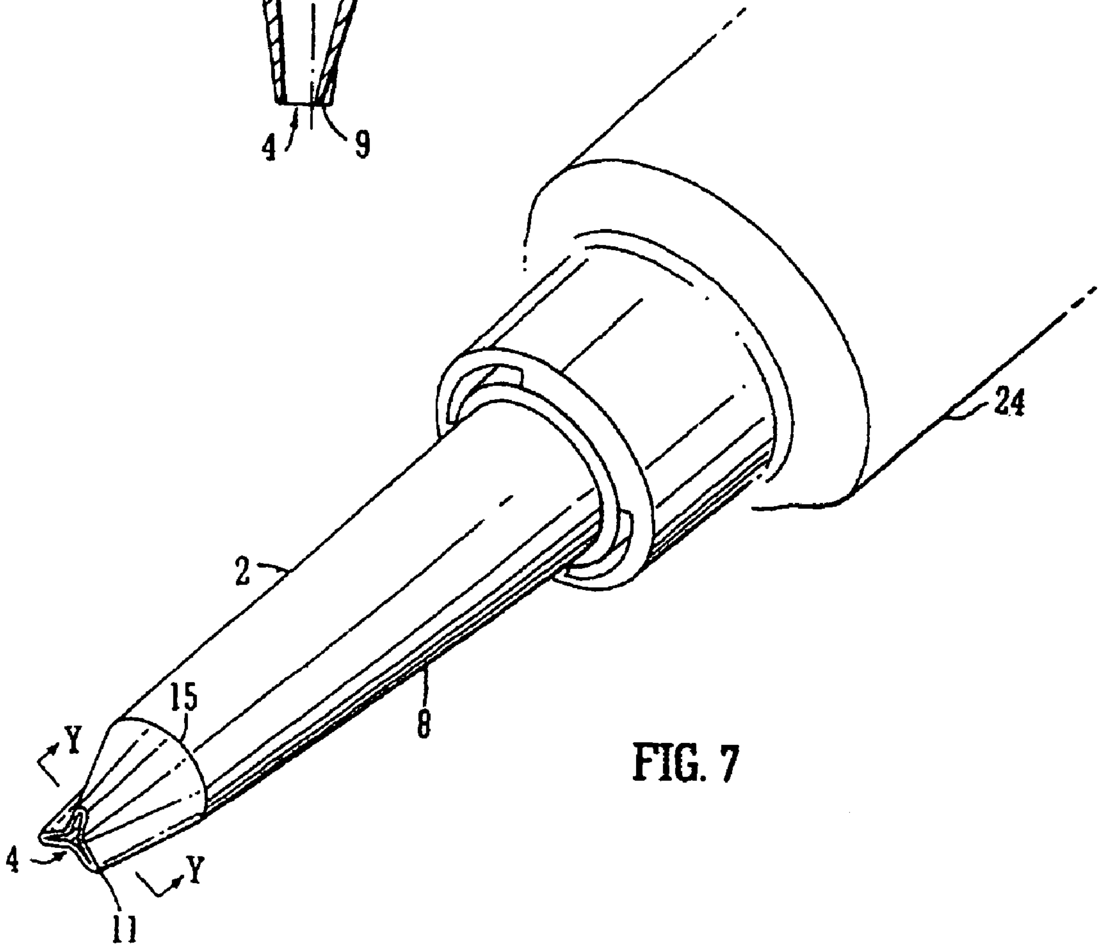
FIG. 7 is a perspective view of the nozzle of FIG. 2 mounted on a valve or storage container.

FIG. 7 shows the connection of the nozzle of FIGS. 2 to 6 to a storage container 24. The storage container 24 is adapted to store a reservoir of the product.

Although shown directly attached to the nozzle 1 it will be appreciated by those skilled in the art that the nozzle need not be directly attached, as a plurality of fluid communication lines may be disposed between the nozzle and the storage container.

Figure 11:
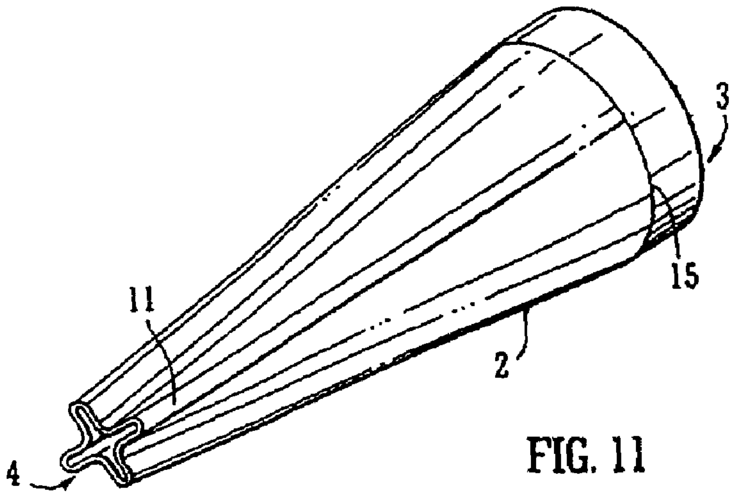
FIG. 11 is a perspective view of an alternative embodiment of a nozzle in accordance with the present invention.

FIG. 11 shows an alternative embodiment of the present invention wherein the dispensing region is formed not by three, but rather four lobes arranged about a central axis. The same reference numerals are used for the same features. This embodiment also differs from that described with reference to FIGS. 2 to 6 in that the transition line 15 is located adjacent to the entry port 3 such that the generally conical configuration with the ribs 11 extends substantially the length of the body 2 of the nozzle.

Figure 12:
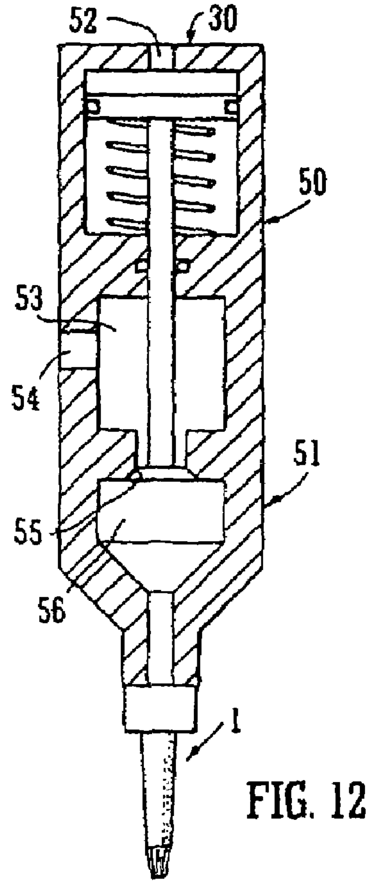
FIG. 12 is a cross-section through a suitable dispensing valve having a nozzle according to the invention mounted thereon.

FIG. 12 shows a cross section through a dispensing valve 30 having a nozzle 1 mounted thereon. The dispensing valve comprises an actuator section 50 and a valve section 51. Compressed air is supplied to the actuator section 50 through a pneumatic inlet 52. Adhesive is supplied to a high pressure chamber 53 through an adhesive inlet 54. On actuation, the valve is displaced from the valve seat 55 and adhesive passes through a low pressure chamber 56 to the nozzle 1.

Figure 13:
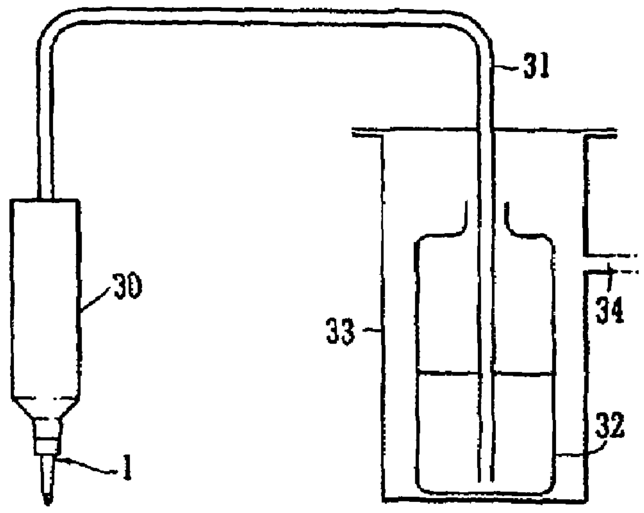
FIG. 13 is a diagram showing one example of a dispensing system for use with the present invention.

FIG. 13 shows a diagram of a dispensing system for pressure/time dispensing. The nozzle 1 is mounted on valve 30 whose adhesive inlet 54 is connected by product tube 31 to storage container 32. The container 32 is held in a pressure tank 33 having a further pneumatic supply line 34 to which pneumatic pressure is applied and adjusted by robotic control to supply the adhesive product at an appropriate flow rate to the nozzle, the pressure can be adjusted to take account of changes in robot speed about the substrate.

Figure 14:
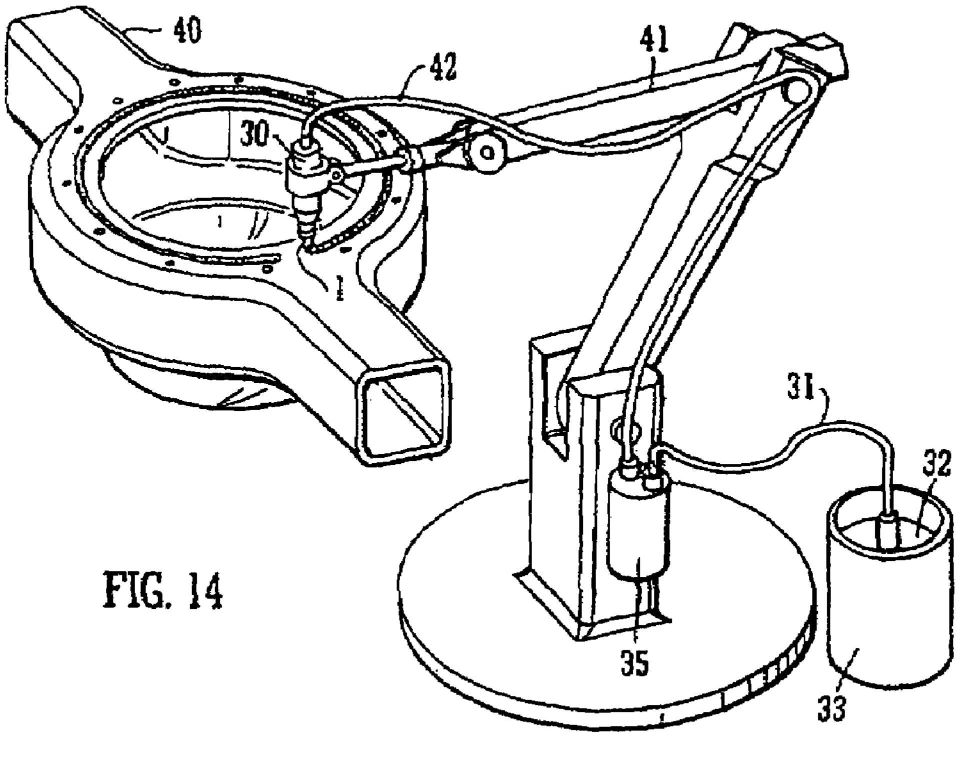
FIG. 14 is a pictorial view of an automatic dispensing system for use with the invention.

FIG. 14 shows one example of a robotic dispensing system being used to apply gasketing material to an engine component 40. The articulated robot arm 41 carries the nozzle 1 and valve 30 which is connected by delivery tube 42 to a pump 35. This is connected by product tube 31 in turn to storage container 32 in pressure tank 33.

The type of pump used will be chosen by the person skilled in the art depending upon various factors, including the type of fluid to be dispensed, the length of the delivery tube 42 to the nozzle, and the material used in manufacturing the nozzle. In some advantageous embodiments of the invention, a volumetric pump is used.

Figure 15:
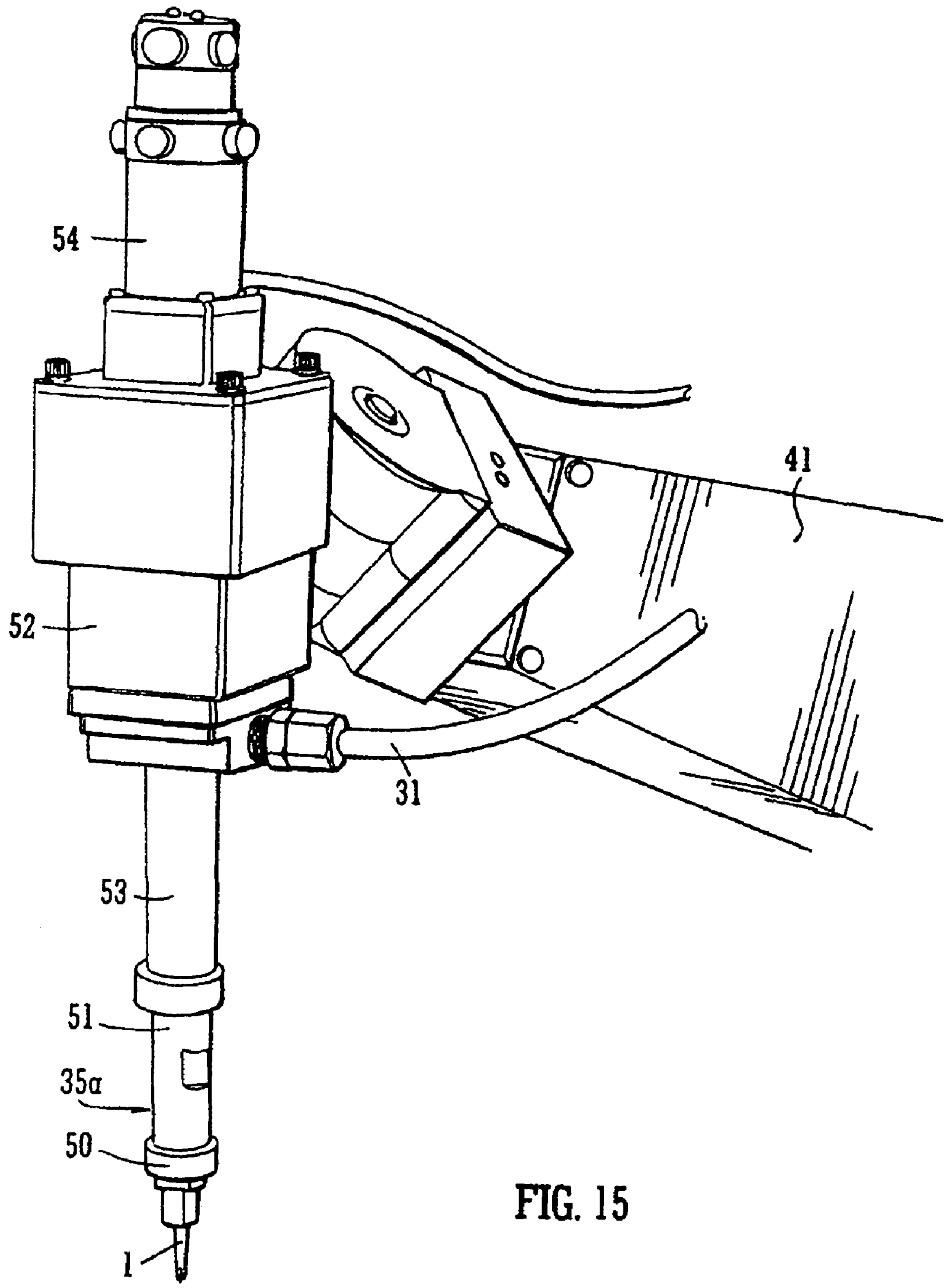
FIG. 15 is a pictorial view of a robot head with a volumetric pump connected directly to a nozzle of the invention.

FIG. 15 shows an embodiment of the invention in which the nozzle 1 is directly attached to a volumetric pump 35*a* via an adapter 50. In this embodiment the volumetric pump is an eccentric motor pump but other types of volumetric pump can be used, as known to those skilled in the art. The pump body 51 houses a rubber stator with a double-helix cavity and an eccentrically rotatable single-helix motor having a pitch which differs from that of the stator by a factor of two. As the motor rotates, a series of sealed cavities are formed and the product is pumped through the unit as a constant volumetric flow. Above the pump 51 there is a gear box 52 connected to the pump by a shaft inside a housing 53. The pump motor 54 is mounted above the gear box, the motor being under robotic control. The product to be dispensed is supplied to the pump 35*a* by a product tube 31 similar to that in FIG. 14, connected to a storage container. The pump unit and nozzle are carried on a robot arm which is similar to that in FIG. 14 except that in this embodiment the pump is directly attached to, and moves with the nozzle as it moves around the substrate under robotic control. The pump speed may also be adjusted by the robot as the nozzle moves. Changes in the robot speed and pump speed are synchronised. However at each selected pump speed, the product is pumped at constant flow. In the event that there is a blockage at the exit port of the nozzle, the product continues to flow through the closed cavity of the pump, almost independent of the resistance. Pressure therefore builds up rapidly in the nozzle. With a conventional nozzle having, for example a circular exit port, such a pressure build up could cause a breakdown in the pump or pump motor, or a separation of the nozzle from the pump. With a nozzle according to the present invention, when such a blockage commences, the rapid pressure increase causes the valley portions of the nozzle to expand radially outwardly as shown in FIG. 9, so that the blockage is cleared out of the exit port very quickly. In some tests with this embodiment, the clearance of the blockage has occurred in about 100 milliseconds.

With this embodiment it is not necessary to use a valve. The robot switches the pump on and off to control the flow of product directly from the pump to the nozzle.

The volumetric pump can provide a greater build up of pressure at the nozzle than a pressure/time system which is limited to the pressure applied at the supply line 34. A volumetric constant flow system is therefore preferred in implementation of the present invention. Under normal flow conditions, without any blockage, the out put pressure of the pump may suitably be in the range from about 0.5 bar to about 5 bar. In the event of a blockage which is not rapidly cleared, the pressure can build up to the order of 30–35 bar which can at least cause the nozzle to separate from the pump if the nozzle is not made in accordance with the present invention. In an illustrative example of dispensing a product having a DIN viscosity value in the range 60,000 to 120,000 Pa.s at 25° C., at a flow rate of 0.1 g/s at a normal dispensing pressure of 4 bar, the presence of a test obstruction of a rubber particle of cross sectional diameter of 1.6 and length of 2.5 mm within the system of the present invention using a nozzle having a notional central dispensing region diameter of about 0.3 mm requires an increase of pressure to 12–15 bar with the system to push out the obstruction.

Figure 16:
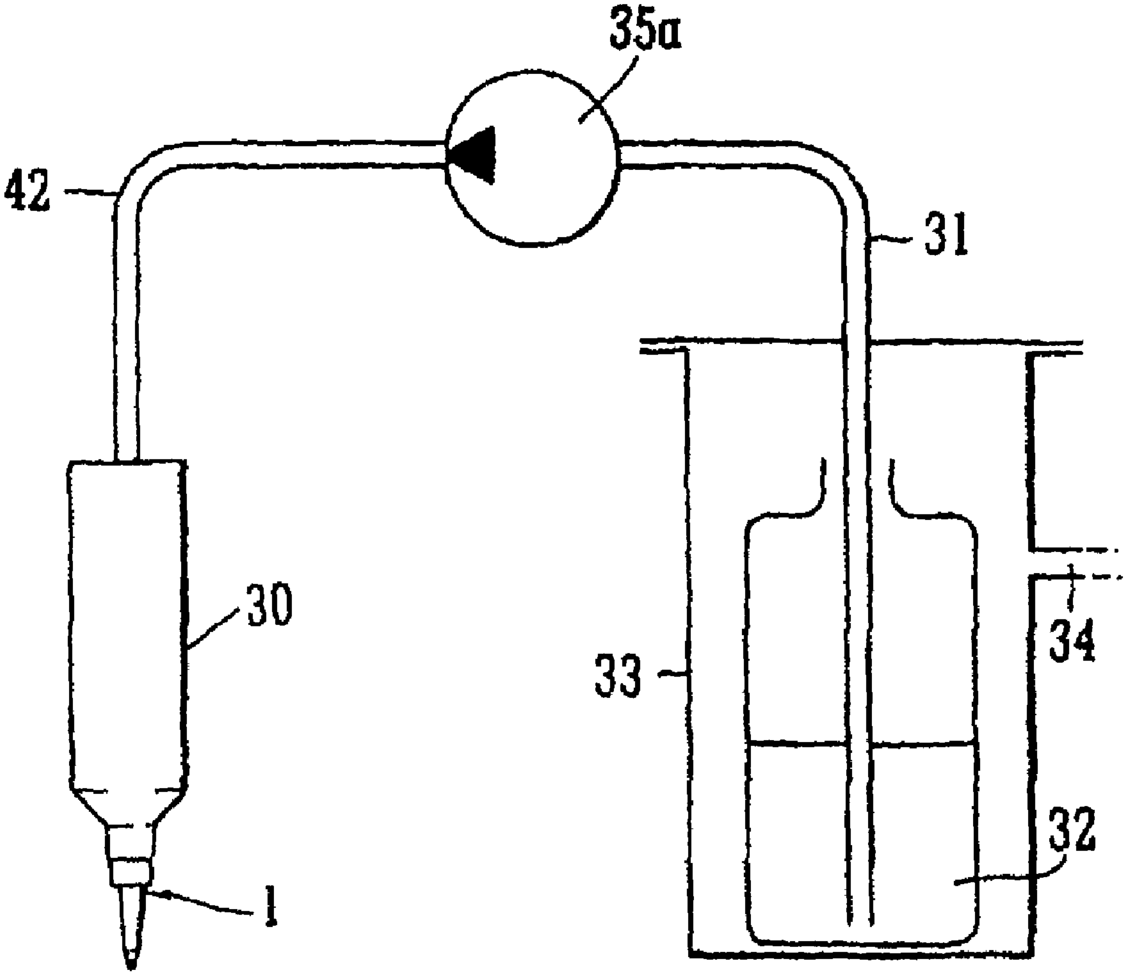
FIG. 16 is a diagram similar to FIG. 13 showing another example of a dispensing system.

FIG. 16 shows a diagram similar to FIG. 13 but with a volumetric pump 35$^{a}$ in the product supply line between the storage container 32 and the valve 30, as in FIG. 14. Because the pump is not carried with the nozzle, a more simple form of robot can be used. However the use of a valve is desirable, at least in the case of a delivery tube 42 of significant length. Due to the flexibility of delivery tubes, flow may not stop and start at the nozzle immediately when the pump is switched on and off. It is desirable that the pump and valve should operate almost simultaneously. In this embodiment, if there is a blockage at the exit port, the pressure build up resulting from the constant flow is not as rapid as in the embodiment of FIG. 15, but nevertheless is effective, in combination with nozzle according to the invention, to overcome the problem of blockages in the nozzle, which could include the splitting of delivery tubes as well as damage to the pump and motor if a blockage is not relieved. The volumetric pump also provides a further advantage, as compared to the embodiment of FIG. 13, in that it has sufficient pressure to deliver huge viscosity products through the delivery lines.

Figure 17:
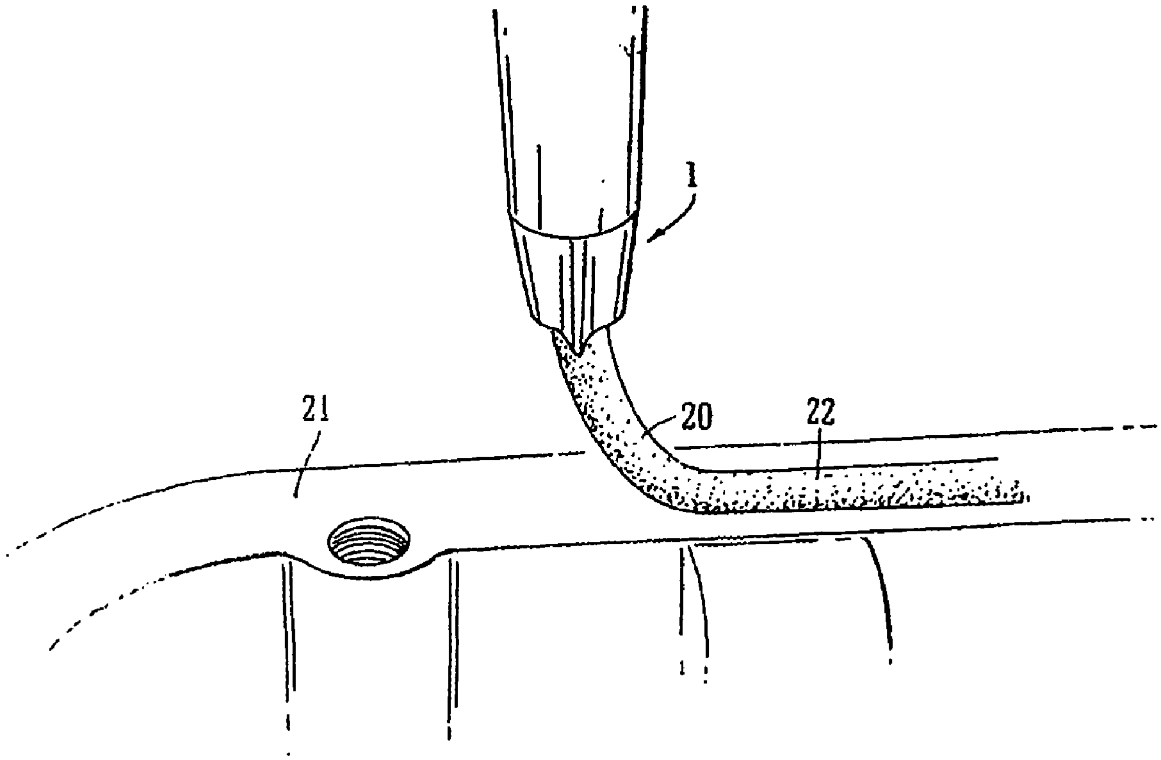
FIG. 17 is a pictorial view of the nozzle of the present invention dispensing product onto a substrate.

FIG. 17 is a pictorial view of the dispensing nozzle of the present invention dispensing adhesive onto a substrate in similar arrangement to that shown previously with reference to the prior art in FIG. 1. The nozzle end portion is positioned at a height of approximately 5 mm above the substrate, which is somewhat higher than that previously described with reference to FIG. 10, and moved about the substrate dispensing product onto the substrate in a predefined pattern. Unlike that described with reference to FIG. 1, the nozzle of the present invention has a reduced tendency to collect adhesive about the end portion of the nozzle, thereby obviating the problem of breaks in the dispensed product onto the substrate. The arrangement of the lobes on the end portion facilitates the direct dispensing from the nozzle to the target location on the substrate thereby enabling a more accurate and efficient dispensing procedure.

The dispensing nozzle of the present invention is preferably formed from a plastics material, such as polypropylene (PP), high density polyethylene (HDPE), medium density polyethylene (MDPE) and low density polyethylene (LDPE), which allow the nozzle to have a degree of compliance or flexibility in the regions of the axis proximate positions. Alternatively a thermoplastic elastomer may be used. By utilising a flexible material, a radially outward expansion of the valley regions of the nozzle is effected on the passage of a particle therethrough. This allows for the passage of particles through the nozzle end portion, the dimensions of which would otherwise result in a constraint or blocking of known systems.

Words such as "above", "below", "upper", "lower" and the like refer to the position of the integer or component shown in the respective drawing and not necessarily to the position of the integer or component in use.

The words "comprises/comprising" and the words "having/including" when used herein with reference to the present invention are used to specify the presence of stated features, integers, steps or components but does not preclude the presence or addition of one or more other features, integers, steps, components or groups thereof.

Although some embodiments of the invention have been described above, many modifications and equivalents thereof will be clear to those persons of ordinary skill in the art and are intended to be covered hereby, the true spirit and scope of the invention being defined by the claims.

What is claimed is:

1. An automated dispensing system for dispensing anaerobic adhesive/sealant in bead form to a substrate, said system incorporating a dispensing nozzle moveably carried on a robotic arm for movement of the nozzle about the substrate, the nozzle having a hollow body with an entry port and an exit port, the body having a wall with an internal wall surface which defines an elongate conduit arranged about a longitudinal axis of the nozzle, and linking the entry port to the exit port, wherein at the exit port the internal wall surface alternates in distance from the axis between axis proximate positions and axis distal positions, thereby forming a dispensing opening in the exit port of non-circular cross sectional area, the axis proximate positions of the internal wall surface being disposed on a notional circle which defines a central dispensing region of the dispensing opening.

2. A system according to claim 1 incorporating a nozzle wherein the wall of the body in the regions of the axis proximate positions is flexible radially outwardly.

3. A system according to claim 1 incorporating a nozzle wherein the wall of the body is of generally uniform wall thickness around the exit port, so that the external wall surface extends generally parallel to the internal wall surface and the wall alternates in distance from the axis between axis proximate positions and axis distal positions.

4. A system according to claim 1 incorporating a nozzle wherein the exit port comprises a dispensing region of substantially non-circular cross-section formed by the body wall, with ribs on the outer surface of the body resulting from the formation of the axis distal positions of the wall, and valleys between the ribs corresponding to the axis proximate positions of the wall, the ribs and valleys extending axially inwardly from the dispensing opening to form a ribbed portion of the wall.

5. A system according to claim 4 incorporating a nozzle wherein the ribbed portion of the body wall tapers towards the dispensing opening.

6. A system according to claim 1 incorporating a nozzle wherein the body wall defining the dispensing opening is continuous.

7. A system according to claim 1 incorporating a nozzle wherein the alternating in distance of the wall from the axis forms a dispensing opening having a plurality of lobes extending radially from the axis, the lobes being spaced circumferentially about the axis.

8. A system according to claim 7 incorporating a nozzle having at least three lobes equally spaced about the axis.

9. A system according to claim 7 incorporating a nozzle wherein the plurality of axis distal positions of the internal wall surface define apexes of respective lobes.

10. A system according to claim 7 incorporating a nozzle wherein the axis proximate positions of the internal wall surface define therebetween a plurality of mouths of lobes, each mouth being defined by the region between two adjacent axis proximate positions.

11. A system according to claim 7 incorporating a nozzle 7 wherein ribs are formed in the body wall at the axis distal positions, and valley regions are formed in the wall between the lobes.

12. A system according to claim 11 incorporating a nozzle wherein the valley regions of the wall are flexible radially outwardly.

13. A system according to claim 1 for dispensing a viscous anaerobic adhesive/sealant containing air bubbles.

14. A system according to claim 1 for dispensing anaerobic adhesive/sealant from a storage container to a substrate, the entry port of which optionally forming an integral part of the storage container or alternatively being connectable to the system, optionally via a pump and adapted to be in fluid communication with the storage container.

15. A system according to claim 14 used in the automotive industry to apply gasketing material to an automotive component, the applied gasketing material forming a gasket on the automotive component.

16. A system according to claim 1 incorporating a nozzle which is formed from a plastics material or an elastomeric material, the material enabling a degree of compliance or flexibility of a nozzle end portion in the regions of the axis proximate positions adjacent to the exit port.

17. An automated dispensing system according to claim 1 wherein the system further comprises a storage container for the fluid to be dispensed, and a pump for delivering the fluid to the nozzle.

18. An automated dispensing system according to claim 17 wherein the pump is a volumetric pump.

19. An automated dispensing system according to claim 17 wherein the pump is carried on the robotic arm and is directly connected to the nozzle.

20. A process for using a system according to claim 1 in the automated dispensing of an anaerobic adhesive/sealant onto a substrate, steps of which comprise:

pumping anaerobic adhesive/sealant from a storage container to a nozzle as defined in claim 1;

moving the nozzle on a robotic arm about the substrate;

dispensing the adhesive/sealant from the nozzle to the substrate through the dispensing opening of non-circular cross sectional area at the exit port of the nozzle;

permitting the central dispensing region of the dispensing opening to expand to free a particle in the adhesive/sealant which may block the exit port; and forming a bead of adhesive/sealant on the substrate.

21. A method of forming a bead of adhesive on a substrate which comprises applying the adhesive by means of an automated dispensing system according to claim 1.

22. In an automated dispensing system for dispensing an anaerobic adhesive/sealant in bead form as a sealant in the provision of gaskets in the automotive industry, a nozzle according to claim 1.

* * * * *

UNITED STATES PATENT AND TRADEMARK OFFICE

CERTIFICATE OF CORRECTION

PATENT NO. : 6,986,472 B2
APPLICATION NO. : 10/332527
DATED : January 17, 2006
INVENTOR(S) : Fergal Anthony Gordon It is certified that error appears in the above-identified patent and that said Letters Patent is hereby corrected as shown below:

Column 4, line 2, delete “month-piece” and insert therefor --mouth-piece--.

Column 10, line 49, delete “pump” and insert therefor --pumps--.

Signed and Sealed this

Twenty-ninth Day of April, 2008

JON W. DUDAS
*Director of the United States Patent and Trademark Office*